US006805192B1

United States Patent
Nagayama et al.

(10) Patent No.: US 6,805,192 B1
(45) Date of Patent: Oct. 19, 2004

(54) HEAT RADIATING STRUCTURE OF AN INTERIOR MEMBER AND RELATED METHOD

(75) Inventors: Hiroki Nagayama, Yokohama (JP); Youichirou Kondou, Zushi (JP); Hiroaki Miura, Kamakura (JP)

(73) Assignee: Nissan Motor Co., Ltd., Yokohama (JP)

( * ) Notice: Subject to any disclaimer, the term of this patent is extended or adjusted under 35 U.S.C. 154(b) by 0 days.

(21) Appl. No.: 10/728,902

(22) Filed: Dec. 8, 2003

(30) Foreign Application Priority Data

Dec. 10, 2002 (JP) ........................................ 2002-358122

(51) Int. Cl.[7] .............................. B60H 3/00; F25B 29/00; F28F 7/00
(52) U.S. Cl. ........................... 165/42; 165/41; 165/149; 165/48.1; 165/904; 165/185
(58) Field of Search ................... 165/41, 42, 48.1, 165/48.2, 49.61, 133, 169, 185, 904; 361/676, 688; 250/352, 353; 62/264; 219/757, 759; 126/92 B, 92 C; 180/69.2

(56) References Cited

U.S. PATENT DOCUMENTS

| 3,174,537 | A | * | 3/1965 | Meyer | 165/42 |
| 3,310,102 | A | * | 3/1967 | Trombe | 165/133 |
| 4,030,316 | A | * | 6/1977 | Aronson | 62/467 |
| 4,078,603 | A | * | 3/1978 | Saunders | 165/48.2 |
| 4,264,664 | A | * | 4/1981 | Kunz | 428/142 |
| 4,337,758 | A | * | 7/1982 | Meinel et al. | 126/684 |
| 4,423,605 | A | * | 1/1984 | Petrick et al. | 62/467 |
| 4,668,873 | A | * | 5/1987 | Ohba et al. | 307/9.1 |
| 5,405,680 | A | * | 4/1995 | Chang et al. | 428/212 |

FOREIGN PATENT DOCUMENTS

JP          9-295509 A     11/1997

* cited by examiner

Primary Examiner—Henry Bennett
Assistant Examiner—Tho V Duong
(74) Attorney, Agent, or Firm—Foley & Lardner LLP (57) ABSTRACT

A heat radiating structure of an interior member is provided with a heat radiating portion adapted to be applied to a vehicle and disposed on a rear surface of an interior member whose surface is adapted to be applied with external energy, a heat receiving and radiating portion connected to a vehicle body of the vehicle, and a reflecting member allowing heat radiation, radiating from the heat radiating portion to an inside of the interior member, to be reflected and propagated to the heat receiving and radiating portion. The reflecting member cooperates with the heat radiating portion and the heat receiving and radiating portion to define a closed space.

16 Claims, 4 Drawing Sheets

HEAT RADIATING STRUCTURE OF AN INTERIOR MEMBER AND RELATED METHOD

BACKGROUND OF THE INVENTION

The present invention relates to a heat radiating structure of an interior member and its related method, and more particularly, to a heat radiating structure of an interior member and its related method wherein, in order to improve a temperature environment in a vehicle compartment of an automobile, attempt is made to release heat retained by an interior member, such as one represented by an instrument panel, to be re-radiated to the vehicle compartment and heat accumulated inside the interior member and to release heat filled inside the vehicle that is parking under the brazing sun.

A compartment inside a vehicle such as an automobile parking under an environment with the brazing sun reaches an extremely high temperature and, in measured examples conducted for a summer environment in Japanese territory, an air temperature inside the compartment reaches a value of approximately 70° C. It is needless to say that improvement over displeasure in such a circumstance is earnestly expected.

As a measure to counter such high temperature and heat environment inside the compartment, heat exchange is to be achieved so as to cool air inside the compartment and, to this end, an air conditioning unit has been used in the past to lower the room temperature. However, during parking of the vehicle under the brazing sun, heat builds up on a surface of the interior member to cause the temperature inside the interior member to increase, resulting in a situation under which electronic component parts located inside the interior member, i.e., especially, inside the instrument panel, are exposed to the high temperature. Upon consideration of such a situation, there is a need for using the electronic component parts that have an excellent heat-resistant property, with becoming factors for increasing costs.

Further, a measure to counter the high temperature inside the interior member has been undertaken to have the electronic component parts wound with heat insulating material such as urethane form or resin felt.

Also, another proposal has been made to provide a structure wherein lowering the temperature inside the compartment allows the surface or the inside of the interior member to be cooled. Japanese Patent Application Laid-Open Publication No. 9-295509 discloses a structure in which a solar battery is used as an electric power supply to achieve forced ventilation in the vehicle compartment.

SUMMARY OF THE INVENTION

However, upon careful studies undertaken by the present inventors, with the structure wherein such heat insulating material is applied to the electronic component parts inside the interior member, the heat insulating material merely plays a roll to delay the temperature rise, resulting in occurrence of no fundamental measure.

Further, with the structure in which the forced ventilation is performed inside the vehicle compartment using the solar battery as the electric power supply, it is required to newly install a relatively large-scaled apparatus on the vehicle, and such installation lacks actuality in view of installation method of the apparatus and a vehicle style while a marked tendency appears to provide a difficulty in practical use in view of increases in weight and cost. When taking consideration in view of the temperature rise in the vehicle compartment, ventilating air and improving a heat-exchange efficiency of air are low in efficiency to lower the room temperature, with a resultant a certain limitation in obtaining a desired result.

Therefore, in view of the analysis set forth above, approach has been undertaken again to conduct various analyses related to the radiation and reception of heat during parking of the vehicle under the brazing sun. Among these, although a technology of cooling air to be delivered to the vehicle compartment surely provides a certain effect, in order to more directly lower the temperature of vehicle compartment or the inside of the interior member, it is revealed to be important to pay attention to the occurrence in which the interior member, such as one represented by the instrument panel, absorbs the sunlight to cause a new heat source to be created. That is, it is thought that, unless heat retained by the interior member is radiated to the outside of the vehicle, it is hard to effectively preclude the temperature rise in the vehicle compartment or the inside of the interior member. Also, when taking a measure to counter the temperature rise in the vehicle compartment or the inside of the interior member, it is desirable to utilize the lowest possible use of power such as electric power because the vehicle stands in parking or halt state, and the use of a specific electric power supply, composed of the solar battery, is found to be undesirable in view of an increase in weight and cost. In any case, it is required for realizing a structure that enables utilization of the lowest possible power.

The present invention has been completed upon various studies conducted by the present inventors as described above and has an object to provide a heat radiating structure of an interior member and its related method wherein heat retained in an interior member, such as one represented by an instrument panel, is prevented from applying heal radiating to an inside of the interior member or from re-radiating heat to a vehicle compartment for preventing an increase in an internal temperature of the interior member when left under the brazing sun while making it possible to improve a temperature and heat environment in the vehicle compartment.

To achieve the above object, as one aspect of the present invention, there is provided a heat radiating structure of an interior member, comprising: a heat radiating portion adapted to be applied to a vehicle and disposed on a rear surface of an interior member whose surface is adapted to be applied with external energy; a heat receiving and radiating portion connected to a vehicle body of the vehicle; and a reflecting member allowing heat radiation, radiating from the heat radiating portion to an inside of the interior member, to be reflected and propagated to the heat receiving and radiating portion, the reflecting member cooperating with the heat radiating portion and the heat receiving and radiating portion to define a closed space.

Stated another way, as another aspect of the present invention, there is provided a heat radiating structure of an interior member, comprising: heat radiating means, adapted to be applied to a vehicle and disposed on a rear surface of an interior member whose surface is adapted to be applied with external energy, for radiating heat; heat receiving and radiating means, connected to a vehicle body of the vehicle, for receiving the heat radiated from the heat radiating means and radiating the heat to an outside; and reflecting means for reflecting heat radiation radiating from the heat radiating portion to an inside of the interior member to propagate the heat radiation to the heat receiving and radiating means, the reflecting means cooperating with the heat radiating means and the heat receiving and radiating means to define a closed space.

In the meantime, as another aspect of the present invention, there is provided a method of radiating heat from an interior member, the method comprising: performing heat radiation from a heat radiating portion located on a rear surface of an interior member adapted to be applied to a vehicle and having a surface applied with external energy; and receiving the heat radiation from the heat radiating portion and radiating heat to an outside using a heat receiving and radiating portion located in connection to a vehicle body of the vehicle, the heat radiation propagated from the heat radiating portion being reflected at a reflecting portion and propagated to the heat receiving and radiating portion, and the reflecting portion cooperating with the heat radiating portion and the heat receiving and radiating portion to define a closed space.

Other and further features, advantages, and benefits of the present invention will become more apparent from the following description taken in conjunction with the following drawings.

DETAILED DESCRIPTION OF THE PREFERRED EMBODIMENTS

Hereunder, a heat radiating structure of an interior member and its related method of each of various embodiments according to the present invention are described below in detail with reference to the accompanying drawings. Also, throughout the drawings, reference symbol "FR" designates a vehicle front, "UPR" a vehicle upward and "L" vehicle leftward, respectively.

(First Embodiment)

Now, a heat radiating structure of an interior member and its related method of a first embodiment according to the present invention are described in detail.

Figure 1:
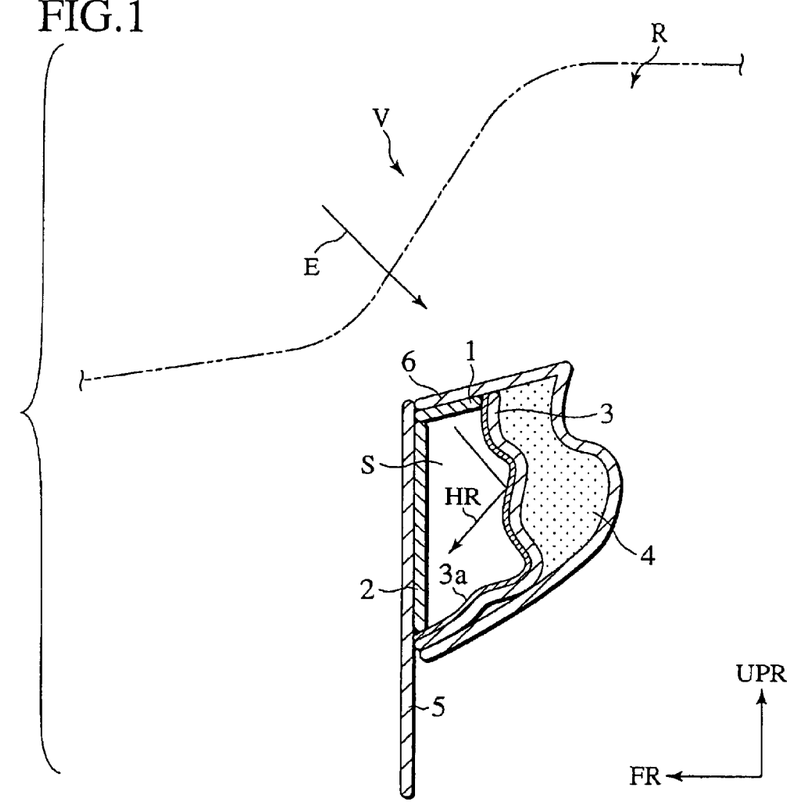
FIG. 1 is a cross sectional view of an instrument panel of an automobile of a first embodiment according to the present invention.

FIG. 1 is a cross sectional view of an instrument panel forming an automobile interior member of the presently filed embodiment.

As shown in FIG. 1, the instrument panel 6, located in front of a vehicle compartment R of an automobile which is a vehicle having a vehicle body V, is mounted to a dash panel 5 that is made of a steel plate per se or connected to such a steel plate and forms a component part of a vehicle body. By the dash panel 5, the vehicle compartment and a forward portion of the vehicle body such as an engine bay are separated from one another. Left and right ends of the instrument panel 6 are closed and component parts 4, such as mechanical parts and electrical parts, are installed inside the instrument panel 6. The heat radiating structure of the interior member includes, in an internal structure of the instrument panel 6, a heat radiating portion 1 disposed on a rear surface of the instrument panel 6, and a heat receiving and radiating portion (hereinafter, simply referred to as a heat receiving portion) 2 disposed on the dash panel 5, with respective peripheral portions of the heat radiating portion 1 and the heat receiving portion 2, involving the left and right ends of the heat radiating portion 1 and the heat receiving portion 2, being surrounded with and closed by a reflecting member 3 having a curved shape such that a closed space S is defined. Of course, if the occasion demands, the closed space S may be simply defined by closing left and right ends thereof by use of the left and right ends of the instrument panel 6 in addition to the reflecting member 3 only facing the heat radiating portion 1 and the heat receiving portion 2. Incidentally, for the sake of convenience, the closed space S is shown as a closed section in FIG. 1.

Here, the temperature rise in the vehicle compartment R occurs due to heat energy E applied to air or component parts in the vehicle compartment R, and a surface of the instrument panel 6 is subjected to such an application of the heat energy E to generate heat in the instrument panel 6 and the temperature of the instrument panel 6 increases. In the meantime, the temperature rise inside the instrument panel 6 occurs when the surface of the instrument panel 6 is heated and new heat radiation radiates from the rear surface of the instrument panel 6 to the inside thereof whereby the component parts 4, disposed inside the instrument panel 6, are subjected to such heat radiation and heated up. Accordingly, mere approach to discharge hot air from the inside of the instrument panel 6 makes it hard to effectively lower the temperature, and there is a need for providing a structure by which heat accumulated in the instrument panel 6 forming a heat source is effectively released to the outside of the vehicle compartment.

Therefore, the presently filed embodiment contemplates adopting a structure in which the heat radiating portion 1 is disposed on the rear surface of the instrument panel 6 at an upper area, which is apt to be mostly heated, of the instrument panel 6 and in the meantime, the heat receiving portion 2 is disposed on at least a part of the dash panel 5 that is relatively low in temperature and exposed to the outside of the vehicle compartment, whereupon the peripheral areas of the heat radiating portion 1 and the heat receiving portion 2, that is, the space between the heat radiating portion 1 and the heat receiving portion 2 are surrounded by the reflecting member 3 to form the closed space S. This allows the heat radiation HR, radiating from the rear surface of the instrument panel 6 to the inside thereof, to be reflected by the reflecting member 3 to be propagated and conducted to the heat receiving portion 2 disposed on the dash panel 5. Incidentally, for the sake of convenience, each of the heat radiating portion 1 and the heat receiving portion 2 may be simply thought as a kind of a blackbody.

Further, many probabilities exist where the component parts 4 inside the instrument panel 6 are usually colored in black, and since such black colored component parts 4 are liable to absorb heat radiation covering in an infrared wavelength band, heat build-up tends to be further induced. Therefore, the presently filed embodiment contemplates adopting a structure wherein not only the peripheral areas of the heat radiating portion 1 and the heat receiving portion 2 are surrounded with the reflecting member 3 to form the closed space S but also the component parts 4 inside the instrument panel 6 are separated from the closed space S. This enables the component parts 4 to be shielded from heat radiation HR, resulting in a capability of avoiding resulting temperature rise of the component parts 4.

Consequently, heat radiation HR radiated from the heat radiating portion 1 is reflected in multiple reflections by the reflecting member 3 and conducted to the heat receiving portion 2 without inviting any excessive temperature rise, thereby causing received heat to be radiated to the outside of the vehicle via the heat receiving portion 2 located on the dash panel 5.

More particularly, it is preferable for the surface of the reflecting member 3, facing the closed space S, which is defined with the heat radiating portion 1, disposed on the rear surface of the instrument panel 6, and the heat receiving portion 2, disposed on at least a part of the dash panel 5, in cooperation, to have emissivity in a range equal to or less than 0.4 and, more preferably, equal to or less than 0.2 in a measuring method based on ASTM (The American Society for Testing and Materials standard) C 1371-98. This is because of the fact that if the heat emissivity is deviated from such a range, the reflecting member 3 is unable to allow heat radiation from the heat radiating portion 1 to be effectively reflected, and the heat radiation can not be adequately conducted to the heat receiving portion 2.

Furthermore, it is preferable for the heat radiating portion 1 disposed on the rear surface of the instrument panel 6 and the heat receiving portion 2 disposed on at least the part of the dash panel 5 to have emissivity in a range equal to or greater than 0.7 and, more preferably, equal to or greater than 0.85 in the measuring method based on ASTM C 1371-98. The surface of the heat radiating portion 1 needs to effectively release heat energy obtained from its surface to a lower area, and the heat receiving portion 2 needs, after such heat energy is directly transmitted or indirectly transmitted though reflection, to absorb the heat energy whereupon the heat energy is required to be effectively released to the outside of the vehicle. This is because of the fact that if such emissivity is deviated from the above range, heat radiation from the surface of the heat radiating portion 1 decreases and release of heat, resulting from the heat receiving portion 2 that has absorbed the heat radiation from the heat radiating portion 1, decreases to cause the temperature to rise in the vehicle compartment and the component parts 4. Incidentally, it is not objectionable for the surface of the heat receiving portion 2, facing inside the closed space S, to be provided with a separate member to enable heat radiation to be easily absorbed.

Moreover, the surface of the reflecting member 3 may be preferably provided with a thin film or thin plate having a characteristic with a high reflectivity in the infrared wavelength band, as designated at 3a. This allows a reflection function of the reflecting member 3 to be enhanced and a strength and rigidity of the reflecting member 3 to be supplied for maintaining the reflecting member 3 in a given shape. Also, the surfaces of the component parts 4 present inside the instrument panel 6 may be covered with similar reflecting material or a thin film having a high reflectivity in the infrared wavelength band with scrupulous care. Additionally, when using an air conditioning duct, made of resin material such as polypropylene, in the closed space S, such reflecting material and thin film may be covered on the air conditioning duct. Moreover, in a case where the heat radiating portion 1 and the heat receiving portion 2 do not cover wholes of the instrument panel 6 and the dash panel 5 facing the closed space S, the reflecting member 3 may be covered on those remaining areas.

Further, the thin plate and the thin film, to be covered on the surface of the reflecting member 3 and to have an infrared ray reflecting characteristic, may respectively include a metal foil, a film formed through vapor deposition of metal or a combination of these components. It is preferable for the infrared ray reflecting characteristic to lie at a value equal to or greater than 70% of reflectivity in the infrared wavelength band and, in addition, in view of ease of availability and handling of material, it is particularly preferable to use a heat radiation reflection film whose layer having such infrared ray reflecting character is formed by vapor deposition of metal.

Further, as the layer having such infrared ray reflecting characteristic, it is possible to use an aluminum foil, a copper foil, a metal vapor deposit film resulting from sputtering aluminum oxide or copper oxide on a resin film, an aluminum foil on which a transparent resin layer is attached, a copper foil on which a transparent resin layer is attached, a resin film on which aluminum is deposited, a resin film applied with reflecting coating material, a resin film formed of reflecting material or a mixture of reflecting material and white pigments, and a metal vapor deposit film resulting from sputtering aluminum oxide or copper oxide onto unwoven cloth made of polyester or polyester fiber.

Here, when using the reflecting layer formed of the aluminum foil, the copper foil, the aluminum foil on which the transparent resin layer is adhered or the copper foil on which the transparent resin layer is adhered, a thickness of the reflecting layer may preferably lie at a value equal to or greater than 1 $\mu$m and equal to or less than 1000 $\mu$m and, more preferably, a value equal to or greater than 5 $\mu$m and equal to or less than 50 $\mu$m in view of a desired reflecting characteristic.

Furthermore, when using any one of the aluminum vapor deposit resin film, the resin film applied with reflecting coating material or the resin film containing reflecting material or the mixture of reflecting material and white pigments, the resin film may have an average transmissivity of a value equal to or greater than 70% in a visible range to the infrared wavelength band so as to preclude the infrared ray, coming through an area in the absence of aluminum or reflecting coating, from being absorbed by the resin film. Moreover, the resin film may be preferably made of material such as polyester or polyethylene in consideration of a heat-resistant property and flexibility. Also, it is preferable for the resin film to have a thickness falling at a value equal to or greater than 5 $\mu$m and equal to or less than 100 $\mu$m in view of ease of handling. In addition, it is preferable for the layer, in which aluminum is deposited, to have a thickness lying at a value equal to or greater than 5 $\mu$m and equal to or less than 100 $\mu$m.

Further, as the reflecting coating material, material including aluminum scales can be used as main component. The thickness of coating material may preferably fall in a range equal to or greater than 10 nm and equal to or less than 100 $\mu$m like the thickness of the aluminum layer attached on the resin layer. As the reflecting material or the white pigments to be mixed into resin, aluminum scales or titania fine-grains or mica powder coated with titania may be preferably used. The percentage content of each element may preferably fall in a range equal to or greater than 0.001 weight % and equal to or less than 0.2 weight %. This is because of the fact that with the percentage content being less than 0.001%, the transmissivity increases whereas even if the above element is mixed at the percentage content exceeding a value of 0.2 weight %, a heat radiation reflecting effect falls in a saturated condition.

As set forth above, using the structure of the presently filed embodiment enables advantages effects to be obtained as described below.

Due to an ability in which heat radiation, radiated from the rear surface of the instrument panel 6, is conducted to the outside of the vehicle without causing heat to be absorbed by the component parts 4 located inside the instrument panel 6, it becomes possible to preclude undesired temperature rise in the component parts 4 disposed inside the instrument panel 6.

Further, the heat energy to be absorbed by the instrument panel 6 is possibly released to the outside of the vehicle in the minimum distance, enabling heat to be prevented from radiating to the vehicle compartment.

Furthermore, since the heat receiving portion 2 disposed on the dash panel 5 is held in contact with or connected to the steel plate forming the vehicle body, a heat radiation effect to the outside of the vehicle through the heat receiving portion 2 can be increased.

Accordingly, it is possible to prevent heat retained in the interior member, represented by the instrument panel, from radiating to the inside of the instrument panel 6 and from re-radiating to the vehicle compartment, thereby providing a capability of improving temperature and heat environment in the vehicle compartment.

(Second Embodiment)

Next, a heat radiating structure of an interior member and its related method of a second embodiment according to the present invention are described below in detail.

Figure 2:
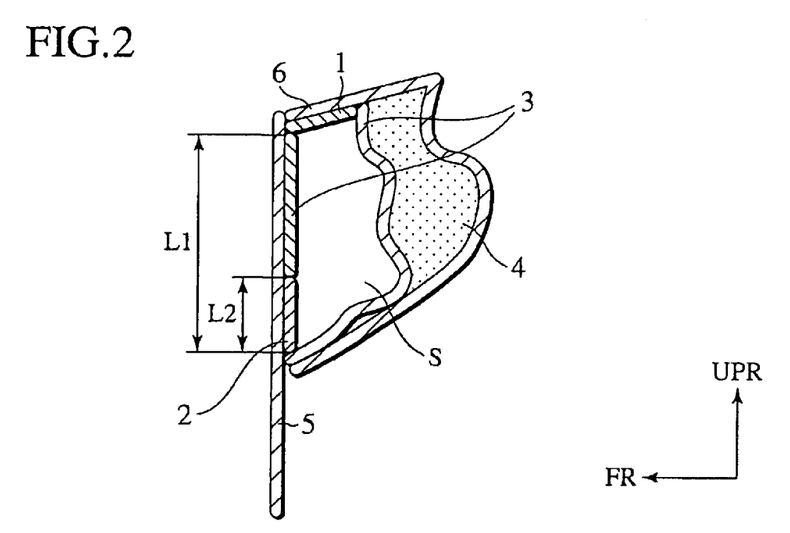
FIG. 2 is a cross sectional view of an instrument panel of an automobile of a second embodiment according to the present invention.

FIG. 2 is a cross sectional view of an instrument panel that forms an automobile interior member of the presently filed embodiment.

As shown in FIG. 2, a fundamental structure of the presently filed embodiment is the same as that of the first embodiment and differs from the same in that the heat receiving portion 2 to be located on the dash panel 5 at a part thereof is disposed on a lower portion of the dash panel 5 in an area facing the closed space S in a length L2(L2≦½×L1) that is equal to or less than a half the length L1 of the dash panel 5. The remaining structure of the presently filed embodiment is similar to that of the first embodiment and, therefore, like component parts bear the same reference numerals with description being suitably simplified or omitted.

More particularly, the presently filed embodiment has a structure wherein the heat radiating portion 1 is disposed on the rear surface of the instrument panel 6 and the heat receiving portion 2 is disposed on the lower portion of the dash panel 5 at the area, facing the closed space S, in the length L2 while, additionally, remaining peripheral areas of the closed space S excepting the heat radiating portion 1 and the heat receiving portion 2 are entirely covered with the reflecting member 3.

That is, the closed space S is defined with the heat radiating portion 1 disposed on the rear surface of the instrument panel 6, the heat receiving portion 2 disposed on the lower portion of the dash panel 5 in the area half the length of the dash panel 5, the reflecting member 3 disposed on the dash panel 5 at an upper portion thereof, and the reflecting member 3 shielding the component parts 4 from heat radiation.

As described above, with the structure of the presently filed embodiment, the presence of the heat receiving portion 2 disposed on the dash panel 5 at the lower portion thereof in the area half the length of the dash panel 5 enables heat to be radiated to an area prevailing in a further increased temperature difference, and increase in the internal temperature of the interior can be effectively suppressed while making it possible to improve the temperature and heat environment in the vehicle compartment.

(Third Embodiment)

Next, a heat radiating structure of an interior member and its related method of a third embodiment according to the present invention are described below in detail.

Figure 3:
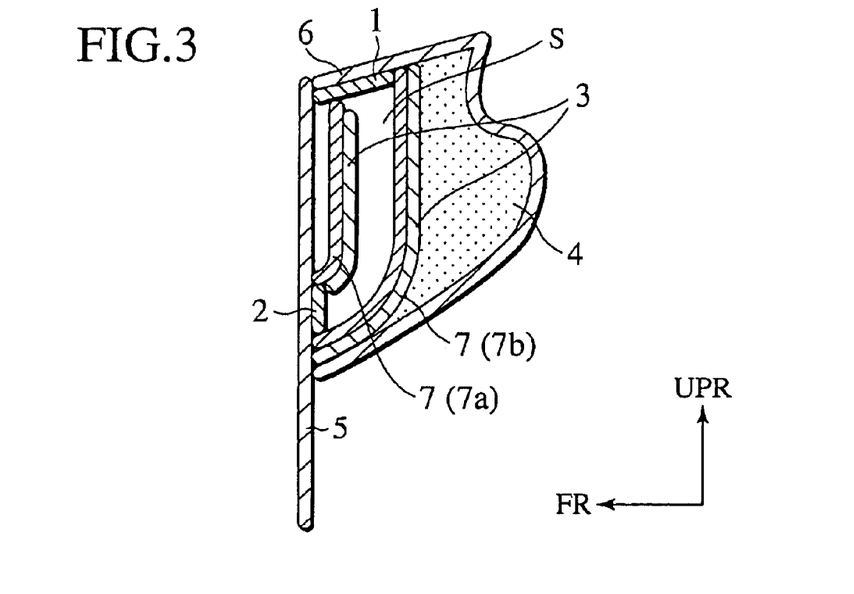
FIG. 3 is a cross sectional view of an instrument panel of an automobile of a third embodiment according to the present invention.
Figure 4:
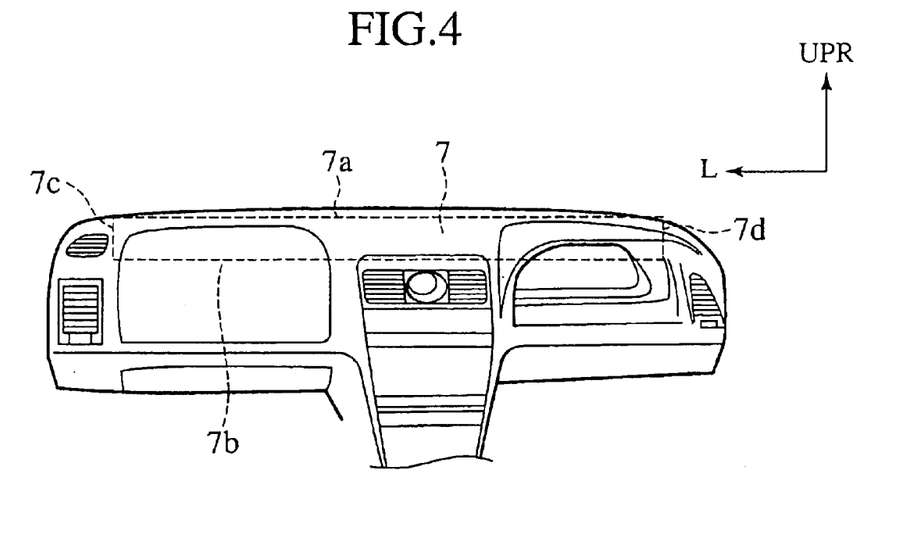
FIG. 4 is a view illustrating an example of a ducted structure forming part of the third embodiment.

FIG. 3 is a cross sectional view of an instrument panel that forms an automobile interior member of the presently filed embodiment, and FIG. 4 is a view illustrating an example of a ducted structure of the presently filed embodiment.

As shown in FIGS. 3 and 4, a fundamental structure of the presently filed embodiment is the same as that of the second embodiment and differs from the same in that a ducted structure 7 is provided to interconnect the heat radiating portion 1, disposed on the rear surface of the instrument panel 6, and the heat receiving portion 2, disposed on the dash panel 5, with respect to one another, and in that the reflecting member 3 is disposed over a surface of the ducted structure 7, facing the closed surface S, which is internally defined with the heat radiating portion 1 and the heat receiving portion 2 in cooperation. The remaining structure of the presently filed embodiment is similar to that of the second embodiment and like component parts bear the same reference numerals with description being suitably simplified or omitted.

More particularly, with the presently filed embodiment, upon consideration of a situation in which, since the instrument panel 6 has an extremely complicated internal structure and the dash panel 5 has the lower portion exposed to an extremely lower temperature than the upper portion of the dash panel 5 to enable the biggest possible temperature difference to be taken, it is preferable for heat to be reliably conducted to the lower portion of the dash panel 5 to cause heat to be effectively radiated to the outside of the vehicle, the ducted structure 7 is provided and includes duct component members 7a to 7d respectively disposed at a side closer to the dash panel 5 and at a side closer to the component parts 4 for the purpose of more clearly define a heat conducting path between the heat radiating portion 1 and the heat receiving portion 2 to allow heat to be conducted from the heat radiating portion 1, disposed on the rear surface of the instrument panel 6, to the heat receiving portion 2 disposed on the dash panel 5, exposed at the lower temperature, while preventing heat absorption with the reflecting member 3.

That is, the presently filed embodiment contemplates providing the ducted structure 7 that is defined with the closed space S present between the heat radiating portion 1 and the heat receiving portion 2 to allow the heat radiating portion 1 and the heat receiving portion 2 to be directly connected to one another and that has an internal surface formed of the reflecting member 3 to more reliably form a heat conducting path for enabling heat to be effectively radiated to the outside of the vehicle. Also, such duct component members 7a to 7d are made of resin material such as polypropylene resin. Additionally, the surface of the reflecting member 3 may be covered with a thin film having the high reflectivity in the infrared wavelength band, as described with reference to the first embodiment, with scrupulous care.

Figure 5:
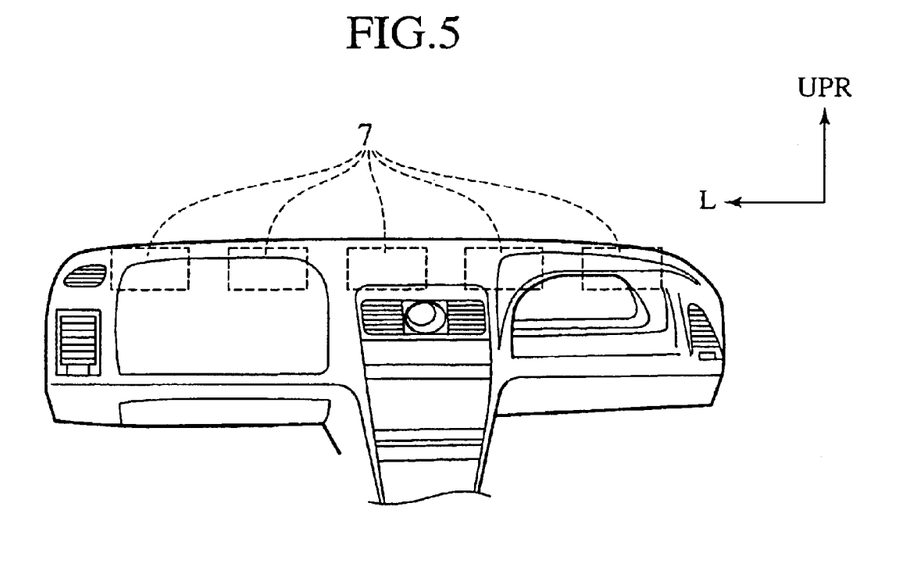
FIG. 5 is a view illustrating another example of a ducted structure forming part of the third embodiment.

Further, such a ducted structure may take the form of suitably selected number of ducted structure components to define any number of heat conducting paths in the instrument panel 6 to enable more efficient heat radiation to be performed, and thus, not only a single ducted structure may be provided in an elongated state in a widthwise direction of the vehicle as shown in FIG. 4, but also a plurality of divided ducted structures may be separately located in the widthwise direction of the vehicle as shown in FIG. 5. That is, a plurality of heat conducting paths can be suitably provided inside the instrument panel 6, enabling more efficient heat radiation to be performed.

Incidentally, while the structure of the presently filed embodiment has been described in conjunction with an example as applied to the structure of the second embodiment, it is, of course, needless to say that a concept of the presently filed embodiment can be applied to the structure of the first embodiment.

(Fourth Embodiment)

Next, a heat radiating structure of an interior member and its related method of a fourth embodiment according to the present invention are described below in detail.

Figure 6:
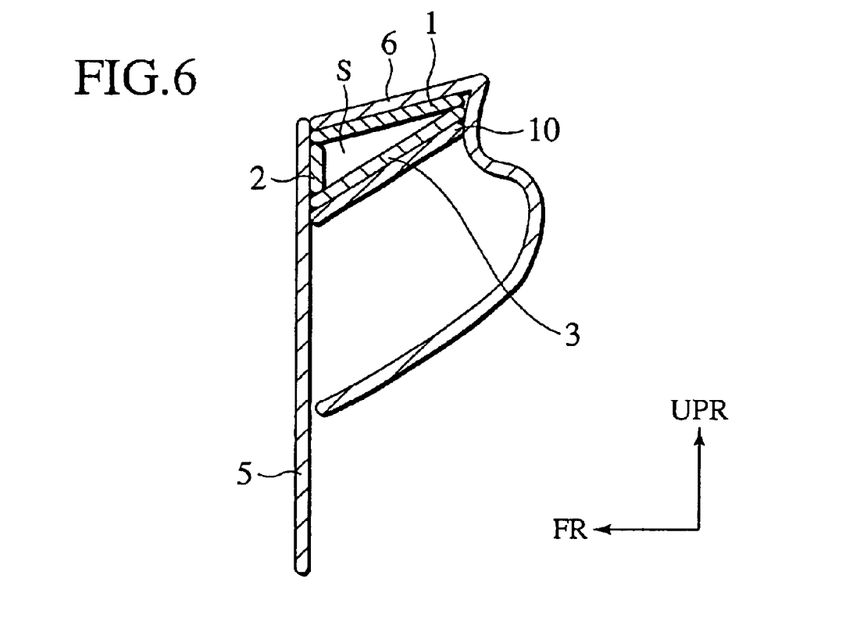
FIG. 6 is a cross sectional view of an instrument panel of an automobile of a fourth embodiment according to the present invention.

FIG. 6 is a cross sectional view of an instrument panel that forms an automobile interior member of the presently filed embodiment.

As shown in FIG. 6, a fundamental structure of the presently filed embodiment is the same as that of the first embodiment and differs from the same in that a resin plate 10 is disposed so as to allow the heat radiating portion 1, disposed on the rear surface of the instrument panel 6, and the heat receiving portion 2 disposed on the dash panel 5 to be connected to one another and the reflecting member 3 is disposed on the resin plate 10 at a surface facing the closed space S defined with the heat radiating portion 1 and the heat receiving portion 2 in cooperation.

More particularly, with the presently filed embodiment, upon consideration of occurrence wherein, in order to allow heat radiation to be more effectively transmitted from the heat radiating portion 1, disposed on the rear surface of the instrument panel 6, to the heat receiving portion 2 exposed at a low temperature, it is effective to have not only a further increased temperature difference but also the presence of the heat radiating portion 1 and the heat receiving portion 2 possibly facing one another to have an increased view factor between the mutually facing surfaces, the resin plate 10 is provided so as to connect the heat radiating portion 1 and the heat receiving portion 2 to one another with a view to permitting the view factor to be set to an increased value between the heat radiating portion 1 and the heat receiving portion 2 to allow heat to be conducted from the heat radiating portion 1, disposed on the rear surface of the instrument panel 6, to the heat receiving portion 2 disposed on the dash panel 5 exposed at the lower temperature, while preventing heat absorption with the reflecting member 3. Here, when taking actual radiation and reception in heat radiation into consideration, it is particularly preferable for the view factor between the heat radiating portion 1 and the heat receiving portion 2 to lie at a value equal to or greater than 0.1.

That is, with the structure of the presently filed embodiment, due to a structure wherein the surface of the closed space S between the heat radiating portion 1 and the heat receiving portion 2 is composed of the reflecting member 3, no heat absorption occurs on the surface of the closed space S, and not only heat can be effectively conducted to a low temperature region but also heat radiation coming from the heat radiating portion 1 can be more reliably received with the heat receiving portion 2 because the heat radiating portion 1 and the heat receiving portion 2 are structured so as to face one another while defining the view factor.

Incidentally, while the presently filed embodiment has been described with reference to the structure wherein the heat radiating portion 1 and the heat receiving portion 2 are disposed adjacent to one another, it is to be noted that the positions and the ranges of these components are relative and, if there is the relationship in which the view factor lies at a value equal to or greater than 0.1, it is not objectionable for the heat radiating portion 1 to be located on the rear surface of the instrument panel 6 and for the heat receiving portion 2 to be located on the dash panel 5.

(Fifth Embodiment)

Next, a heat radiating structure of an interior member and its related method of a fifth embodiment according to the present invention are described below in detail.

Figure 7:
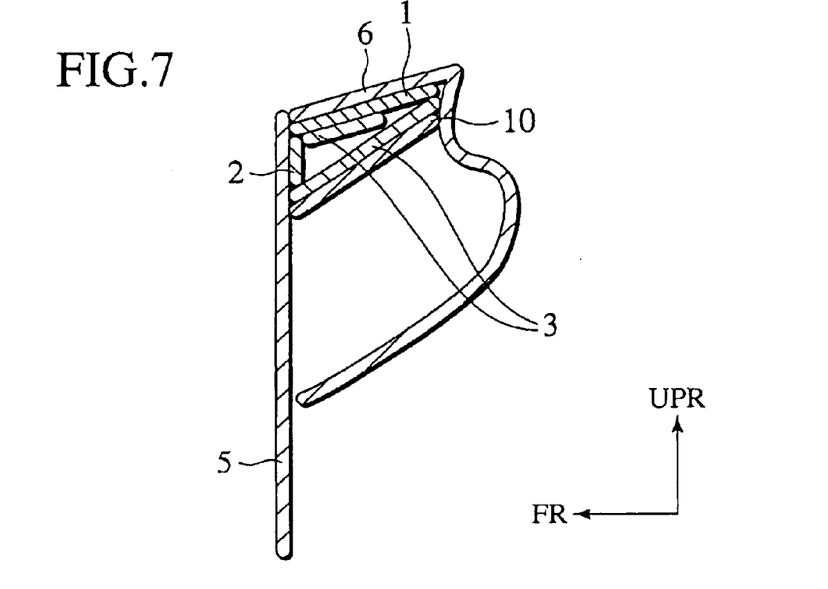
FIG. 7 is a cross sectional view of an instrument panel of an automobile of a fifth embodiment according to the present invention.

FIG. 7 is a cross sectional view of an instrument panel that forms an automobile interior member of the presently filed embodiment.

As shown in FIG. 7, a fundamental structure of the presently filed embodiment is the same as that of the fourth embodiment and takes the form of a structure in that the resin plate 10 is disposed so as to allow the heat radiating portion 1, disposed on the rear surface of the instrument panel 6, and the heat receiving portion 2 disposed on the dash panel 5 to be connected to one another and not only the surface of the resin plate 10 is covered with the reflecting member 3 but also the heat receiving portion 1 is covered with the resin panel to form the reflecting member 3 for causing heat to be further effectively conducted. The range in which the reflecting surface, such as one of the reflecting surface 3, is provided on the heat receiving portion 1 can be arbitrarily determined and, further, respective surfaces of the component parts 4 disposed inside the instrument panel 6 can be possibly utilized.

Figure 8:
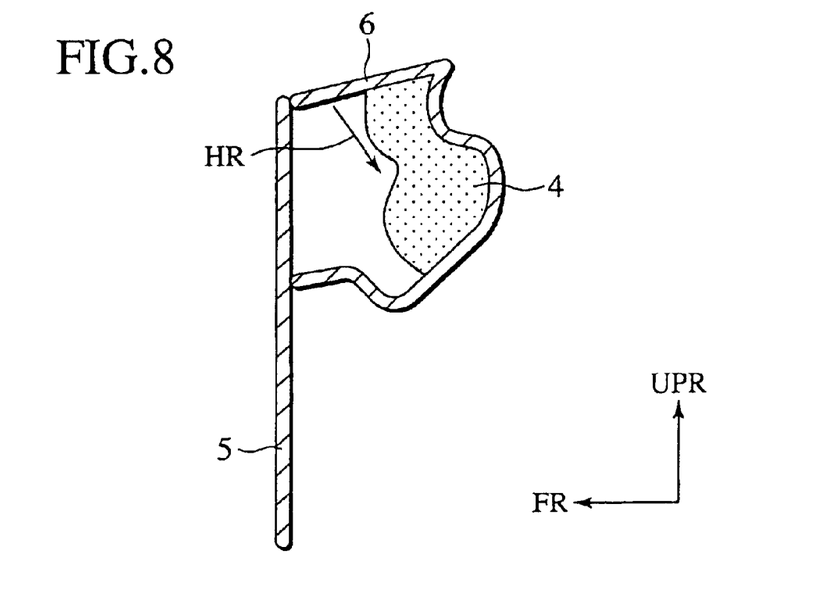
FIG. 8 is a cross sectional view of an instrument panel of an automobile for which various studies have been conducted by the present inventors.

In the meanwhile, FIG. 8 is a cross sectional view of an automobile instrument panel to which the heat radiating structure of the interior member of each of the various embodiments set forth above is not applied.

As shown in FIG. 8, such a structure takes the form of a configuration in which the rear surface of the instrument panel 6 is merely thermally connected to the component parts 4 disposed on the instrument panel 6 and thus heat radiation HR occurs from the rear surface of the instrument panel 6 to the component parts 4 located on the instrument panel 6, with a resultant difficulty in effectively radiating heat to the outside of the vehicle with resultant occurrence of the temperature rise in the inside of the instrument panel 6.

Finally, the heat radiating structures of the interior members of the various embodiments according to the present invention are described below with reference to a concrete Example and Comparative Examples.

FIRST EXAMPLE

Initially, a first Example is described.

In this Example, as one example of the structure of the second embodiment shown in FIG. 2 set forth above, the heat radiating portion 1, made of a polypropylene resin panel, was located over an entire surface of the instrument panel 6 and the heat receiving portion 2 was disposed on the dash panel 5 in the area half the length of the dash panel 5.

The heat receiving portion 2 was placed over the dash panel 5 to cover the same, which is made of steel plate, using a rubber skin (with a thickness of 2 mm) colored in black as undiluted coloring. Also, resulting emissivities, of the heat radiating portion 1 and the heat receiving portion 2, obtained by the measurement method based on ASTM C 1371-98 were set to a value of 0.8.

Further, inside the instrument panel 6, the surface of the closed space S excepting those facing the heat radiating portion 1 and the heat receiving portion 2 was covered with the reflecting member 3 made of a polyethylene film (with a thickness of 25 μm at emissivity of 0.2) that was vapor deposited with metal. Also, the surface, exposed to the interior of the closed space S, of the air conditioning duct was covered with such a reflecting member.

With the vehicle employing the above structure having been left at an atmospheric temperature of 35° C. under the brazing sun in fine weather, a result was obtained wherein the surface temperature of the instrument panel rose to 70° C. and the internal temperature of the instrument panel reached 55° C. In the meantime, with the vehicle that did not employ such a structure, the surface temperature of the instrument panel rose to 90° C. and the internal temperature of the instrument panel reached 70° C.

FIRST COMPARATIVE EXAMPLE

Next, a first Comparative Example is described.

This Comparative Example basically had the same structure as that of the above example set forth above and differs from the above example in that the emissivity of the reflecting member 3 was altered to a value of 0.5.

As a result, even though the surface temperature of the instrument panel 6 slightly decreased, the internal temperature of the instrument panel 6 reached to a value of 65° C. and it appeared that it was hard to obtain a desired performance.

SECOND COMPARATIVE EXAMPLE

Next, a second Comparative Example is described.

This Comparative Example basically had the same structure as that of the above example set forth above and differs from the above example in that the emissivities of the heat radiating portion 1 and the heat receiving portion 2 ware altered to a value of 0.5 by changing undiluted coloring pigments.

As a result, the surface temperature of the instrument panel 6 slightly decreased, the internal temperature of the instrument panel 6 reached to a value of 90° C. and it was approved that no desired result was obtained.

Summarizing the above, the structures of the various embodiments according to the present invention set forth above provides a capability of obtaining advantageous effects listed below.

Due to a capability in which heat radiation radiating from the rear surface of the instrument panel is radiated to the outside of the vehicle after transferring heat without causing heat radiation to be absorbed by the component parts inside the instrument panel, it is possible to restrict the temperature rise of the component parts inside the instrument panel.

At the same time, the heat energy, which would be absorbed by the instrument panel or component parts inside the instrument panel, can be conducted to the outside of the vehicle in the minimum rout, thereby enabling heat to be effectively prevented from being radiated to the vehicle compartment.

The entire content of a Patent Application No. TOKUGAN 2002-358122 with a filing date of Dec. 10, 2002 in Japan is hereby incorporated by reference.

Although the invention has been described above by reference to certain embodiments of the invention, the invention is not limited to the embodiments described above. Modifications and variations of the embodiments described above will occur to those skilled in the art, in light of the teachings. The scope of the invention is defined with reference to the following claims.

What is claimed is:

1. A heat radiating structure of an interior member, comprising:
    a heat radiating portion configured to be applied to a vehicle and disposed on a rear surface of an interior member whose surface is configured to be applied with external energy;
    a heat receiving and radiating portion connected to a vehicle body of the vehicle so that heat is exchanged between the vehicle body and the heat receiving and radiating portion by thermal conduction; and
    a reflecting member allowing heat radiation, radiating from the heat radiating portion to an inside of the interior member, to be reflected toward the heat receiving and radiating portion, the reflecting member cooperating with the heat radiating portion and the heat receiving and radiating portion to define a closed space.

2. The heat radiating structure according to claim 1, wherein the reflecting member is located on a contour surface of the closed space except for the heat radiating portion and the heat receiving and radiating portion.

3. The heat radiating structure according to claim 1, wherein the reflecting member is located on a contour surface, providing connection between the heat radiating portion and the heat receiving and radiating portion, of the closed space.

4. The heat radiating structure according to claim 1, wherein the interior member includes an instrument panel, and the vehicle body includes a dash panel.

5. The heat radiating structure according to claim 4, wherein the heat radiating portion is located on the instrument panel in compliance with an entire surface of the rear surface thereof.

6. The heat radiating structure according to claim 4, wherein the heat receiving and radiating portion is located on at least a part of a surface of the dash panel facing the rear surface of the instrument panel.

7. The heat radiating structure according to claim 4, wherein the reflecting member is located on a contour surface of the closed space except for the rear surface of the instrument panel and at least the part of the surface of the dash panel.

8. The heat radiating structure according to claim 1, wherein the heat radiating portion has emissivity of a value equal to or greater than 0.7 that is obtained by a measurement method based on ASTM C 1371-98.

9. The heat radiating structure according to claim 1, wherein the heat receiving and radiating portion has emissivity of a value equal to or greater than 0.7 that is obtained by a measurement method based on ASTM C 1371-98.

10. The heat radiating structure according to claim 1, wherein the reflecting member has emissivity of a value equal to or less than 0.4 that is obtained by a measurement method based on ASTM C 1371-98.

11. The heat radiating structure according to claim 1, wherein the surface of the reflecting member is applied with at least one of a thin plate and a thin film that reflects an infrared ray.

12. The heat radiating structure according to claim 11, wherein the at least one of the thin plate and the thin film includes at least one of a metallic foil, a film on which metal is vapor deposited, and a combination thereof.

13. The heat radiating structure according to claim 4, wherein the heat receiving and radiating portion is located on the dash panel within a lower half portion with respect to a total height of the dash panel, in the closed space.

14. The heat radiating structure according to claim 4, wherein at least one of the dash panel and the vehicle body connected to the dash panel is made of steel, plate and the heat receiving and radiating portion is connected to the steel plate.

15. A heat radiating structure of an interior member, comprising:

heat radiating means, configured to be applied to a vehicle and disposed on a rear surface of an interior member whose surface is configured to be applied with external energy, for radiating heat;

heat receiving and radiating means, connected to a vehicle body of the vehicle so that heat is exchanged between the vehicle body and the heat receiving and radiating means by thermal conduction, for receiving the heat radiated from the heat radiating means and radiating the heat to an outside; and reflecting means for reflecting heat radiation radiating from the heat radiating portion to an inside of the interior member to propagate the heat radiation to the heat receiving and radiating means, the reflecting means cooperating with the heat radiating means and the heat receiving and radiating means to define a closed space.

16. A method of radiating heat from an interior member, the method comprising:

performing heat radiation from a heat radiating portion located on a rear surface of an interior member configured to be applied to a vehicle and having a surface applied with external energy; and receiving the heat radiation from the heat radiating portion and radiating heat to an outside using a heat receiving and radiating portion located in connection to a vehicle body of the vehicle so that heat is exchanged between the vehicle body and the heat receiving and radiating portion by thermal conduction, the heat radiation propagated from the heat radiating portion being reflected at a reflecting portion and propagated to the heat receiving and radiating portion, and the reflecting portion cooperating with the heat radiating portion and the heat receiving and radiating portion to define a closed space.

* * * * *